United States Patent
Chopra et al.

(10) Patent No.: US 11,379,145 B2
(45) Date of Patent: Jul. 5, 2022

(54) SYSTEMS AND METHODS FOR SELECTING DEVICES FOR BACKUP AND RESTORE OPERATIONS FOR VIRTUAL MACHINES

(71) Applicant: EMC IP Holding Company LLC, Hopkinton, MA (US)

(72) Inventors: Shelesh Chopra, Bangalore (IN); Rahul Deo Vishwakarma, Bangalore (IN); Sharath Talkad Srinivasan, Bengaluru (IN); Parmeshwr Prasad, Bangalore (IN)

(73) Assignee: EMC IP Holding Company LLC, Hopkinton, MA (US)

(*) Notice: Subject to any disclaimer, the term of this patent is extended or adjusted under 35 U.S.C. 154(b) by 0 days.

(21) Appl. No.: 17/117,001

(22) Filed: Dec. 9, 2020

(65) Prior Publication Data
US 2022/0179558 A1      Jun. 9, 2022

(51) Int. Cl.
*G06F 12/00*    (2006.01)
*G06F 3/06*     (2006.01)
*G06F 9/455*    (2018.01)

(52) U.S. Cl.
CPC ............ *G06F 3/065* (2013.01); *G06F 3/0619* (2013.01); *G06F 3/0664* (2013.01); *G06F 3/0673* (2013.01); *G06F 9/45558* (2013.01); *G06F 2009/45583* (2013.01)

(58) Field of Classification Search
None
See application file for complete search history.

(56) References Cited

U.S. PATENT DOCUMENTS 10,511,514 B1 * 12/2019 Vytla ................. H04L 43/16

* cited by examiner

*Primary Examiner* — Daniel D Tsui
(74) *Attorney, Agent, or Firm* — Chamberlain, Hrdlicka, White, Williams & Aughtry

(57) ABSTRACT

Techniques described herein relate to methods for managing backup and restore operations. The method may include obtaining a health data items associated with vProxies; performing a first clustering analysis using the health data items to apply a first vProxy health label to a first portion of the vProxies and a second vProxy health label to a second portion of the vProxies; performing a first confidence analysis to determine a separate vProxy health confidence value for the first vProxy health label assigned to each of the first portion of vProxies; ranking the first portion of vProxies based on the first confidence analysis to obtain a ranked vProxy health list; receiving a request to perform a backup and restore management operation; and providing, in response to the request, a portion of the ranked vProxy health list to an entity requesting the backup and restore management operation.

20 Claims, 5 Drawing Sheets

| Available vProxy | Health Status |
|---|---|
| vProxy A | 95% |
| vProxy B | 92% |
| vProxy H | 87% |
| vProxy J | 72% |
| vProxy K | 64% | vProxy Selection Interface 300

FIG. 3

SYSTEMS AND METHODS FOR SELECTING DEVICES FOR BACKUP AND RESTORE OPERATIONS FOR VIRTUAL MACHINES

BACKGROUND

Computing devices often exist in virtualization environments that include one or more virtualization management devices. Virtualization management devices may be used for managing any number of virtualization hosts. Such hosts may have any number of virtual machines (VMs) deployed on them. Such virtual machines may be backed up to or restored from time to time, and/or at scheduled times. Backup and restore operations may be managed by a backup and restore management device, which may use proxy VMs within the virtualization environment to transmit or receive data to perform the relevant operation. However, the health of the proxy chosen for a backup or restore operation is not considered when the proxy is selected to perform the operation. Instead, other schemes are used to select the proxy, such as random selection. Additionally, the health of virtualization hosts is not considered when selecting a virtualization host to which a VM is to be restored.

SUMMARY

In general, embodiments described herein relate to a method for managing backup and restore operations. The method may include obtaining a first plurality of health data items associated with a plurality of vProxies; performing a first clustering analysis using the first plurality of health data items to apply a first vProxy health label to a first portion of the plurality of vProxies and a second vProxy health label to a second portion of the plurality of vProxies; performing a first confidence analysis to determine a separate vProxy health confidence value for the first vProxy health label assigned to each of the first portion of the plurality of vProxies; ranking the first portion of the plurality of vProxies based on the first confidence analysis to obtain a ranked vProxy health list; receiving a request to perform a backup and restore management operation; and providing, in response to the request, a portion of the ranked vProxy health list to an entity requesting the backup and restore management operation.

In general, embodiments described herein relate to a non-transitory computer readable medium that includes computer readable program code, which when executed by a computer processor enables the computer processor to perform a method for managing backup and restore operations. The method may include obtaining a first plurality of health data items associated with a plurality of vProxies; performing a first clustering analysis using the first plurality of health data items to apply a first vProxy health label to a first portion of the plurality of vProxies and a second vProxy health label to a second portion of the plurality of vProxies; performing a first confidence analysis to determine a separate vProxy health confidence value for the first vProxy health label assigned to each of the first portion of the plurality of vProxies; ranking the first portion of the plurality of vProxies based on the first confidence analysis to obtain a ranked vProxy health list; receiving a request to perform a backup and restore management operation; and providing, in response to the request, a portion of the ranked vProxy health list to an entity requesting the backup and restore management operation.

In general, embodiments described herein relate to a system for managing backup and restore operations. The system may include a backup and restore management device comprising a processor, a memory device, a storage device, and a health analyzer. The health analyzer may comprise circuitry, and be configured to obtain a first plurality of health data items associated with a plurality of vProxies; perform a first clustering analysis using the first plurality of health data items to apply a first vProxy health label to a first portion of the plurality of vProxies and a second vProxy health label to a second portion of the plurality of vProxies; perform a first confidence analysis to determine a separate vProxy health confidence value for the first vProxy health label assigned to each of the first portion of the plurality of vProxies; rank the first portion of the plurality of vProxies based on the first confidence analysis to obtain a ranked vProxy health list; receive a request to perform a backup and restore management operation; and provide, in response to the request, a portion of the ranked vProxy health list to an entity requesting the backup and restore management operation.

Other aspects of the embodiments disclosed herein will be apparent from the following description and the appended claims.

BRIEF DESCRIPTION OF DRAWINGS

Certain embodiments of the invention will be described with reference to the accompanying drawings. However, the accompanying drawings illustrate only certain aspects or implementations of the invention by way of example and are not meant to limit the scope of the claims.

FIG. 3 shows an example in accordance with one or more embodiments of the invention.

DETAILED DESCRIPTION

Figure 1A:
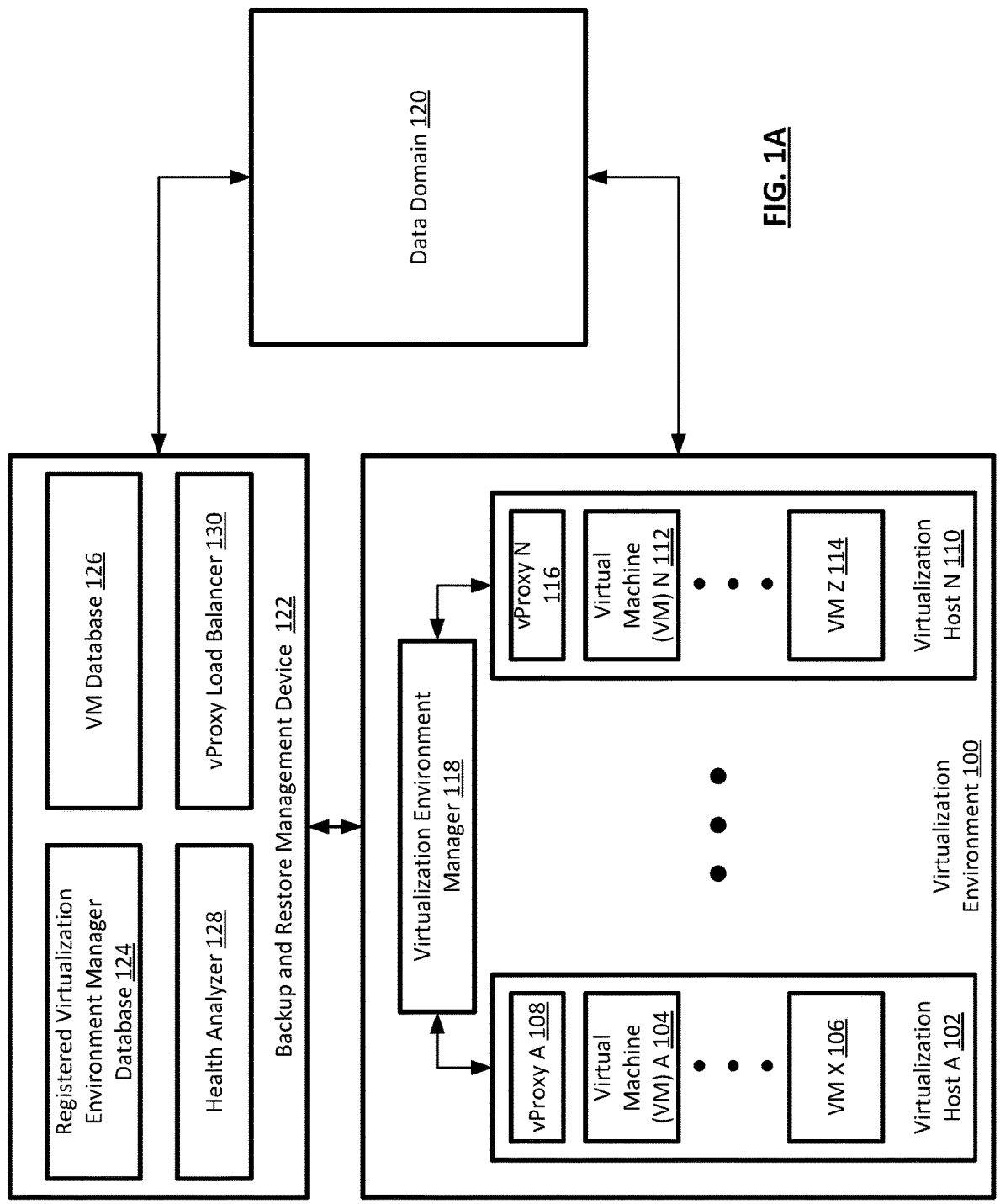
FIG. 1A shows a diagram of a system in accordance with one or more embodiments of the invention.

Specific embodiments will now be described with reference to the accompanying figures.

In the below description, numerous details are set forth as examples of embodiments described herein. It will be understood by those skilled in the art, that have the benefit of this Detailed Description, that one or more embodiments of the embodiments described herein may be practiced without these specific details and that numerous variations or modifications may be possible without departing from the scope of the embodiments described herein. Certain details known to those of ordinary skill in the art may be omitted to avoid obscuring the description.

In the below description of the figures, any component described with regard to a figure, in various embodiments described herein, may be equivalent to one or more like-named components described with regard to any other figure. For brevity, descriptions of these components will not be repeated with regard to each figure. Thus, each and every embodiment of the components of each figure is incorporated by reference and assumed to be optionally present within every other figure having one or more like-named components. Additionally, in accordance with various embodiments described herein, any description of the components of a figure is to be interpreted as an optional embodiment, which may be implemented in addition to, in conjunction with, or in place of the embodiments described with regard to a corresponding like-named component in any other figure.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

As used herein, the phrase operatively connected, or operative connection, means that there exists between elements/components/devices a direct or indirect connection that allows the elements to interact with one another in some way. For example, the phrase 'operatively connected' may refer to any direct (e.g., wired directly between two devices or components) or indirect (e.g., wired and/or wireless connections between any number of devices or components connecting the operatively connected devices) connection. Thus, any path through which information may travel may be considered an operative connection.

In general, embodiments described herein relate to methods, systems, and non-transitory computer readable mediums storing instructions for assessing the relative health of vProxies and/or virtualization hosts, and making information relating to the health of such devices available to entities requesting backup and/or restore operations for virtual machines (VMs).

Backup and restore operations are important tasks for successful data protection. To perform backup and/or restore of VMs, a proxy VM (vProxy) may be used to offload at least a portion of the workload of data transmission to and/or from backup storage devices (e.g., a data domain) to the vProxy.

However, using a vProxy currently has limitations. For example, vProxies are often assigned randomly. Therefore, even though more sessions may be available in a first vProxy as compared to a second vProxy, the second vProxy may be used for backing up a new VM, which may adversely affect backup and/or restore performance.

Said another way, resources consumed by a vProxy increase with the number of concurrent backup and/or restore operations, but such resource consumption is not accounted for when a vProxy is selected for another backup or restore operation.

Backup and/or restore of a VM may be performed with using a variety of data transport modes (e.g., hotadd, network block device (NBD), etc.). Currently, vProxy allocation does not differentiate between such transport modes.

Embodiments described herein enable an entity (e.g., a virtualization environment administrator) seeking to perform a backup and/or restore operation to obtain a list of available healthy vProxies ranked according to respective heath scores for performing backup and restore operations. Additionally, embodiments described herein enable an entity seeking to perform a restore operation to obtain a list of available healthy virtualization hosts ranked according to respective heath scores for performing restore operations In one or more embodiments, data items related to the health of vProxies and virtualization hosts are obtained by a health analyzer. In one or more embodiments, the data items are stored in a time series database to be used in analyzing the health of the vProxies and virtualization hosts. In one or more embodiments, the health analyzer performs a clustering analysis to create two clusters, which are then labeled high (i.e., high health) and low (i.e., low health). In one or more embodiments, a confidence analysis is then performed (e.g., using a transductive confidence machine) to assign a confidence score to the labels (i.e., high or low) assigned to each vProxy and virtualization host. In one or more embodiments, the confidence scores for the vProxies assigned a high label are then ranked from highest to lowest. In one or more embodiments, the confidence scores for virtualization hosts assigned a high label are also then ranked from highest to lowest.

In one or more embodiments, when an entity seeking to perform a backup operation requests the backup operation, a list of available vProxies for performing the backup operation is provided in ranked order from more healthy to less healthy. In one or more embodiments, the entity may then choose which vProxy to use for performing the backup operation. For example, if the backup operation is of critical importance, then the vProxy with the highest health score may be selected. Similarly, if the backup of the VM is less critical, a less healthy vProxy may be selected to perform the backup operation, thereby not adding a backup burden on a higher health vProxy, which may subsequently be needed for a more critical backup operation.

In one or more embodiments, when an entity seeking to perform a restore operation requests the restore operation, a list of available vProxies for performing the restore operation is provided in ranked order from more healthy to less healthy. In one or more embodiments, the entity may then choose which vProxy to use for performing the restore operation. For example, if the restore operation is of critical importance, then the vProxy with the highest health score may be selected. Similarly, if the restore of the VM is less critical, a less healthy vProxy may be selected to perform the restore operation, thereby not adding a restore burden on a higher health vProxy, which may subsequently be needed for a more critical restore operation.

In one or more embodiments, the entity may subsequently also be provided with a list of virtualization hosts, or any portion thereof (e.g., storage, hypervisor, etc.) in ranked order from more healthy to less healthy. In one or more embodiments, similar to the vProxy selection, the entity requesting the restore operation may select an appropriate virtualization host to which the VM will be restored.

In one or more embodiments, ranking virtualization hosts, or portions thereof, may also be used when determining where to deploy vProxies within a virtualization environment.

FIG. 1A shows a diagram of a system in accordance with one or more embodiments described herein. The system may include a virtualization environment (100). The virtualization environment (100) may include a virtualization environment manager (118) and any number of virtualization hosts (e.g., virtualization host A (102), virtualization host N (110)). Virtualization host A (102) may include vProxy A (108) and any number of VMs (e.g., VM A (104), VM X (106)). Virtualization host N (102) may include vProxy N (116) and any number of VMs (e.g., VM N (112), VM Z (114)). The system may also include a backup and restore management device (122). The backup and restore management device (122) may include a registered virtualization environment manager database (124), a VM database (126), a health analyzer (128), and a vProxy load balancer (130). The system may also include a data domain (120). Each of these components is described below.

In one or more embodiments, the virtualization hosts (102, 110) are computing devices of any type located in a common virtualization environment (100), such as, for example, all or any portion of a data center. In one or more embodiments, a virtualization environment (100) is any environment in which any number of computing devices, such as virtualization host A (102) and virtualization host N (110), are subject, at least in part, to a shared scheme pooling compute resources for use in deploying virtualized computing device instances (e.g., VMs, containers, emulators, etc.).

In one or more embodiments, the virtualization hosts (e.g., 102, 110) within the virtualization environment (100) may be any single computing device, collection of computing devices, portion of one or more computing devices, or any other logical grouping of computing resources (e.g., a hyper-converged infrastructure).

In one or more embodiments, a computing device is any device, portion of a device, or any set of devices capable of electronically processing instructions and may include any number of components, which include, but are not limited to, any of the following: one or more processors (e.g. components that include integrated circuitry) (not shown), memory (e.g., random access memory (RAM)) (not shown), input and output device(s) (not shown), non-volatile storage hardware (e.g., solid-state drives (SSDs), hard disk drives (HDDs) (not shown)), one or more physical interfaces (e.g., network ports, storage ports) (not shown), any number of other hardware components (not shown), and/or any combination thereof.

Examples of computing devices include, but are not limited to, a server (e.g., a blade-server in a blade-server chassis, a rack server in a rack, etc.), a desktop computer, a mobile device (e.g., laptop computer, smart phone, personal digital assistant, tablet computer, automobile computing system, and/or any other mobile computing device), a storage device (e.g., a disk drive array, a fibre/fiber channel storage device, an Internet Small Computer Systems Interface (iSCSI) storage device, a tape storage device, a flash storage array, a network attached storage device, etc.), a network device (e.g., switch, router, multi-layer switch, etc.), a virtual machine, a logical container (e.g., for one or more applications), and/or any other type of computing device with the aforementioned requirements.

In one or more embodiments, any or all of the aforementioned examples may be combined to create a system of such devices, which may collectively be referred to as a virtualization host (102, 110) (e.g., a set of blade servers in a blade server rack). Other types of computing devices may be used without departing from the scope of the embodiments described herein.

In one or more embodiments, the non-volatile storage (not shown) and/or memory (not shown) of a computing device or system of computing devices may be one or more data repositories for storing any number of data structures storing any amount of data (i.e., information). In one or more embodiments, a data repository is any type of storage unit and/or device (e.g., a file system, database, collection of tables, RAM, and/or any other storage mechanism or medium) for storing data. Further, the data repository may include multiple different storage units and/or devices. The multiple different storage units and/or devices may or may not be of the same type or located at the same physical location.

In one or more embodiments, any non-volatile storage (not shown) and/or memory (not shown) of a computing device or system of computing devices may be considered, in whole or in part, as non-transitory computer readable mediums storing software and/or firmware.

Such software and/or firmware may include instructions which, when executed by the one or more processors (not shown) or other hardware (e.g. circuitry) of a computing device and/or system of computing devices, cause the one or more processors and/or other hardware components to perform operations in accordance with one or more embodiments described herein.

The software instructions may be in the form of computer readable program code to perform methods of embodiments as described herein, and may, as an example, be stored, in whole or in part, temporarily or permanently, on a non-transitory computer readable medium such as a compact disc (CD), digital versatile disc (DVD), storage device, diskette, tape storage, flash storage, physical memory, or any other non-transitory computer readable medium.

In one or more embodiments, a virtualization host (102, 110) includes a hypervisor (not shown), which may also be referred to as a virtual machine monitor. In one or more embodiments, a hypervisor is any hardware (e.g., circuitry), software, firmware, or any combination thereof that includes functionality to manage the underlying hardware resources of a virtualization host (102, 110), and to make the hardware resources available for use by VMs, which execute on the hypervisor. Thus, the hypervisor abstracts the underlying hardware from the VMs.

In one or more embodiments, the hypervisor receives instructions from VMs and performs the instructions using the appropriate underlying hardware (e.g., processor(s), storage, networking components, etc.) Such instructions from a VM may be altered by the hypervisor into a form appropriate for the underlying hardware. For example, the operating system of a VM may seek to execute instructions for a particular processor type, and the hypervisor may translate the instructions to a form that the actual underlying hardware processors can process. Additionally or alternatively, certain instructions from a VM may be passed through a hypervisor for execution using the underlying hardware without modification. A hypervisor may function as a hardware scheduler that schedules when instructions from various VMs will be executed on underlying hardware. For example, many VMs, each with virtual processors allocated, may require that the hypervisor schedule when the underlying hardware processors will be used to execute instructions for the VMs. Hypervisors may perform any other functions (e.g., provide virtual network components, virtual storage components, etc.) without departing from the scope of embodiments described herein.

In one or more embodiments, virtualization hosts (102, 110) in a virtualization environment (106) may have any number of components for which data items (e.g., health readings) exist and may be obtained. Such health data items may include, but are not limited to: hypervisor health (e.g., based on errors in hypervisor error logs, hypervisor version, etc.); performance logs for the virtualization host or any portion thereof; storage capacity; system model; operating system version information; a set of data collections and/or types to be backed up; whether or not data is encrypted; whether or not data is to be encrypted when stored by a storage device; backup media type (disk, tape, etc.); whether or not garbage collection services are running; number of concurrent backups and restores being performed; storage characteristics (e.g., information about type of media used for backup, age of media, various attributes of the media, etc.); system model information (e.g., cluster information, generation of system, machine check exception history);

information regarding updates and fixes made to a hypervisor after deployment; thermal data (e.g., processor temperature; memory temperature; storage disk temperature, network component temperature; other component temperature; voltage data; current data; power consumption data; ambient temperature data; chassis temperature; inlet temperatures; exhaust temperatures; minimum and maximum temperatures for any component; optical component temperatures; storage controller temperatures; network controller temperatures; alternating current (AC) input information; direct current (DC) input information; fan speed information; fan power consumption information; temperature and power information for various sub-systems; airflow information; etc.). Other types of data items may be used without departing from the scope of embodiments described herein.

In one or more embodiments, a VM (e.g., 104, 106, 112, 114) is an emulation of a computing device (described above), or any portion thereof, that is abstracted from the underlying hardware of a virtualization host (102, 110) that hosts the VM. In one or more embodiments, a VM may include functionality to perform any of the functionality of a physical computing device. For example, a VM may include an operating system in which any number of software applications exist and execute.

In one or more embodiments, one type of VM that may execute on a virtualization host is a vProxy (108, 116). In one or more embodiments, a vProxy (108, 116) may be used to offload at least a portion of the workload of data transmission to and/or from backup storage devices (e.g., a data domain) to the vProxy (108, 116). A vProxy (108, 116) may be a relatively small VM in which an operating system executes and manages software configured to perform backup and restore operations, which may include causing data related to VMs to be copied to a data domain (e.g., a VM backup) or to be restored from a data domain (e.g., a VM restore). In one or more embodiments, a vProxy (108, 116) is packaged as a virtual appliance (e.g., in an .ovf format).

In one or more embodiments, a backup and restore management device (discussed below) causes a vProxy (108, 116) to be added as a VM to any number of virtualization hosts (102, 110) (e.g., via interaction with a virtualization environment manager (118)). In one or more embodiments, each vProxy (108, 116) may have any number of vProxy health data items that can be obtained relating to the vProxy (108, 116). Such vProxy health data items may include, but are not limited to, supported transport modes (e.g., hotadd, NBD), number of concurrent backup and/or restores being performed, underlying health of the virtualization host (discussed below) on which the vProxy (108, 116) executes, etc. Although FIG. 1 shows each virtualization host (102, 110) having a vProxy (108, 116), vProxies may be distributed among the virtualization hosts in any manner. For example, only a portion of the virtualization hosts may have a vProxy, some virtualization hosts may have more than one vProxy, etc. In one or more embodiments, any vProxy (108, 116) may include functionality to perform backup and restore operations for any VM in a virtualization environment (100), (i.e., not just for the VMs on the virtualization host on which the vProxy resides).

In one or more embodiments, a virtualization environment (100) also includes a virtualization environment manager (118). In one or more embodiments, a virtualization environment manager (118) is also a computing device (described above). In one or more embodiments, a virtualization environment manager (118) provides a user interface for one or more entities for managing the virtualization environment (100). As such, the virtualization environment manager (118) is operatively connected to the virtualization hosts (102, 110) of the virtualization environment (100), and therefore has access to information related to the virtualization hosts (102, 110) and to the VMs (104, 106, 112, 114) executing on the virtualization hosts (102, 110), as well as any other computing devices (e.g., storage devices, network devices, etc.) within the virtualization environment (100). In one or more embodiments, a virtualization environment manager (110) allows entities to view information about the computing devices and VMs of a virtualization environment, to modify aspects of the configuration of such devices and VMs, to deploy or remove VMs (104, 106, 112, 114) on the virtualization hosts (102, 110), to configure networking and storage for the VMs, or to perform any other task(s) relevant to managing a virtualization environment (100).

In one or more embodiments, the system also includes a backup and restore management device (122). In one or more embodiments, the backup and restore management device (122) is a computing device (described above). The backup and restore management device (122) may be included in the same virtualization environment (100) as the virtualization hosts (102, 110) and virtualization environment manager (122). Alternatively, as shown in FIG. 1, the backup and restore management device (122) may be located outside of and operatively connected to the virtualization environment (100). In one or more embodiments, the backup and restore management device (122) includes functionality to manage backup and restore operations for VMs (e.g., 104, 106, 112, 114) of the virtualization environment (100). Such operations may be initiated by an entity that administrates the virtualization environment (100), and may or may not be performed pursuant to a planned schedule. In one or more embodiments, the backup and restore management device (122) is operatively connected to the virtualization hosts (102, 110) (e.g., via a virtualization environment manager (118)), and offloads certain aspects of backup and restore of VMs to vProxies (discussed above) residing on one or more virtualization hosts (102, 110).

In one or more embodiments, the backup and restore management device (122) includes a registered virtualization environment manager database (124). In one or more embodiments, a registered virtualization environment manager database (124) is a data repository. In one or more embodiments, a data repository is any type of storage unit and/or device (e.g., a file system, database, collection of tables, RAM, and/or any other storage mechanism or medium) for storing data. Further, the data repository may include multiple different storage units and/or devices. The multiple different storage units and/or devices may or may not be of the same type or located at the same physical location. In one or more embodiments, the registered virtualization environment manager database (124) includes information related to the various registered virtualization environment managers (e.g., 118) that have been registered with the backup and restore management device (122), thereby allowing the backup and restore management device (122) to perform backup and/or restore operations for VMs (104, 106, 112, 114) of virtualization hosts (102, 110) managed by the virtualization environment manager (118) of a virtualization environment (110). The information regarding registered virtualization environment managers (e.g., 118) may include, but is not limited to, identifying information, access information, location information, etc.

In one or more embodiments, the backup and restore management device (122) includes a VM database (126). In one or more embodiments, a VM database (124) is a data repository. In one or more embodiments, a data repository is any type of storage unit and/or device (e.g., a file system, database, collection of tables, RAM, and/or any other storage mechanism or medium) for storing data. Further, the data repository may include multiple different storage units and/or devices. The multiple different storage units and/or devices may or may not be of the same type or located at the same physical location. In one or more embodiments, the VM database (126) stores information related to VMs managed by the registered virtualization environment managers for which information is stored in the registered virtualization environment manager database (124). Information related to VMs that may be stored in the VM database includes, but is not limited to, identifying information, access information, configuration information (e.g., operating system, applications, storage, networking, etc.).

In one or more embodiments, the backup and restore management device (122) also includes a vProxy load balancer (130). In one or more embodiments, a vProxy load balancer (130) is any hardware (e.g., circuitry), software, firmware, or any combination thereof that includes functionality to balance the backup and restore load between vProxies (discussed above) within a virtualization environment (100). For example, a vProxy load balancer (130) may attempt to cause a relatively similar number of concurrent backup and restore sessions of VMs being performed by a set of vProxies within a virtualization environment. As an example, a vProxy load balancer (130) may be one or more processes executing on one or more processors (including circuitry therein) of the backup and restore management device (122) to load balance between vProxies.

In one or more embodiments, the backup and restore management device (122) also includes a health analyzer (128). In one or more embodiments, a health analyzer (128) is any hardware (e.g., circuitry), software, firmware, or any combination thereof that includes functionality to obtain health data items relating to vProxies (108, 116) and/or virtualization hosts (102, 110) in a virtualization environment. In one or more embodiments, a health analyzer (128) obtains the thermal data items via a network interface (not shown) of the backup and restore management device (122). As an example, a health analyzer (128) may be one or more processes executing on one or more processors (including circuitry therein) of the backup and restore management device (122) to obtain and store health data items, and perform various types of analysis based on such data items. The health analyzer (128), and components therein, are discussed further in the description of FIG. 1B, below.

In one or more embodiments, the system also includes a data domain (120). In one or more embodiments, the data domain (120) is a computing device (discussed above) or set of computing devices that include data storage, and includes functionality to store VM information that is used as a backup of a given VM and/or to restore a given VM to a virtualization host (102, 110) of a virtualization environment (100). In one or more embodiments, a backup and restore management device (122) uses one or more vProxies (108, 116) to transport data to and/or from the data domain (120) during backup and restore operations.

In one or more embodiments, the virtualization hosts (102, 110), the data domain (120), and the backup and restore management device (122) are operatively connected via a network (not shown). A network may refer to an entire network or any portion thereof (e.g., a logical portion of the devices within a topology of devices). A network may include a data center network, a wide area network, a local area network, a wireless network, a cellular phone network, or any other suitable network that facilitates the exchange of information from one part of the network to another. A network may be located at a single physical location, or be distributed at any number of physical sites. In one or more embodiments, a network may be coupled with or overlap, at least in part, with the Internet.

While FIG. 1A shows a configuration of components, other configurations may be used without departing from the scope of embodiments described herein. For example, there may be any number of virtualization hosts within a virtualization environment. As another example, there may be any number of VMs on a virtualization host. As another example, there may be any number of virtualization environments, each with any number of virtualization environment managers. As another example, a backup and restore management device may be operatively connected to any number of virtualization environment managers within any number of virtualization environments. As another example, the system may include any number of data domains. As another example, there may be any number of vProxies in a given virtualization environment, which may be distributed in any manner among the virtualization hosts of the virtualization environment. Accordingly, embodiments disclosed herein should not be limited to the configuration of components shown in FIG. 1A.

Figure 1B:
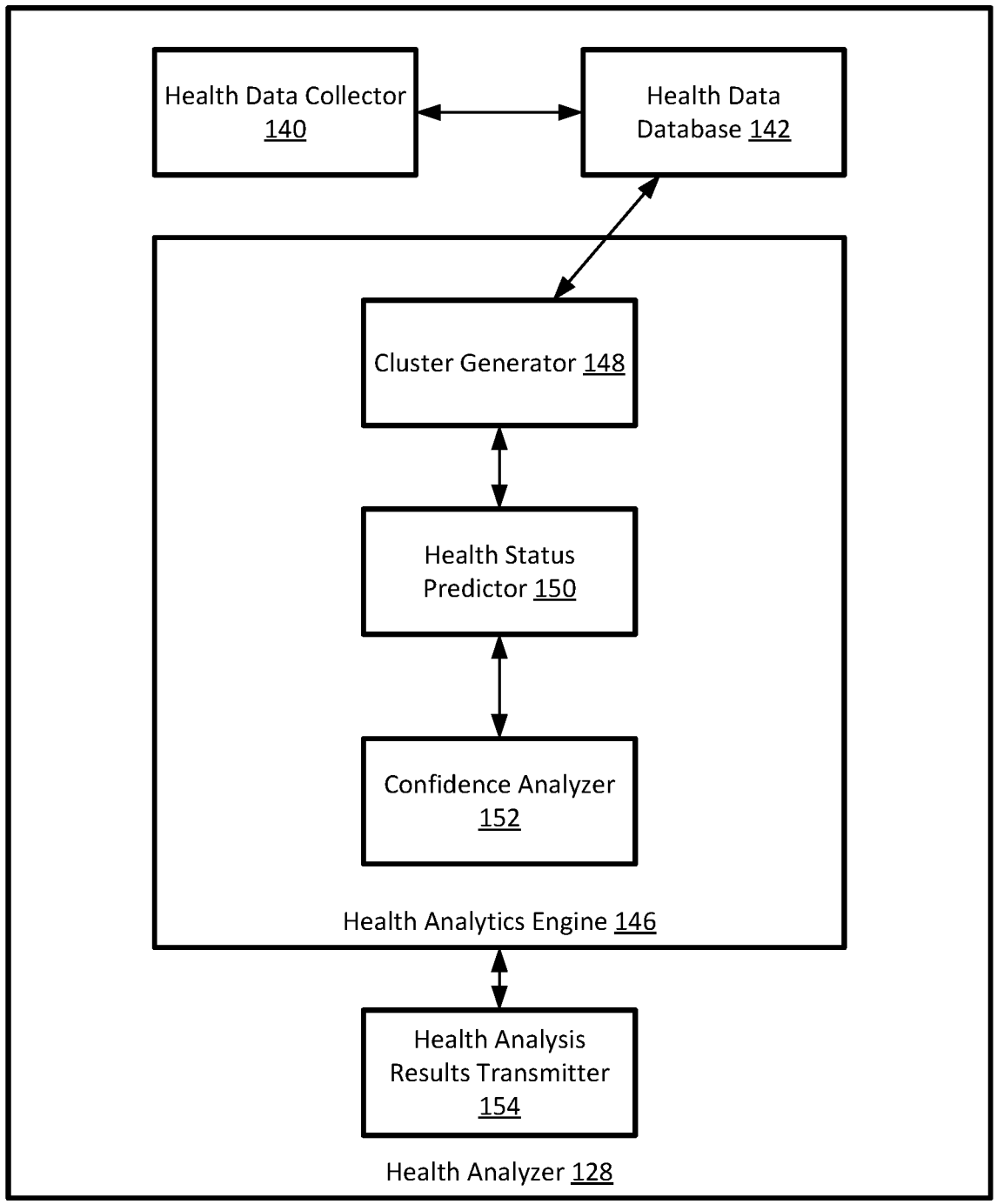
FIG. 1B shows a diagram of a health analyzer in accordance with one or more embodiments of the invention.

FIG. 1B shows a diagram of a health analyzer (128) in accordance with one or more embodiments described herein. The health analyzer (128) may include a health data collector (140), a health database (142), a health analysis results transmitter (154), and a health analytics engine (146). The health analytics engine (146) may include a cluster generator (148), a health status predictor (150), and a confidence analyzer (152). Each of these components is described below.

In one or more embodiments, the health analyzer (128), as discussed above in the description of FIG. 1A, is a computing device, or portion thereof, which may be located within or be external to a virtualization environment (106) that includes vProxies (108, 116) and/or virtualization hosts (102, 110) for which the health analyzer (100) is performing health analysis.

In one or more embodiments, a health data collector (140) is any hardware (e.g., circuitry), software, firmware, or any combination thereof that includes functionality to obtain health data items (discussed above in the description of FIG. 1) of vProxies and virtualization hosts in a virtualization environment. In one or more embodiments, the health data collector (140) obtains the thermal data items via a network interface (not shown) of the health analyzer (128). As an example, a health data collector (140) may be one or more processes executing on one or more processors (including circuitry therein) of the health analyzer (128) to obtain and store health data items.

In one or more embodiments, the thermal analyzer (100) also includes a health data database (142) operatively connected to the health data collector (140). In one or more embodiments, a health data database (142) is a data repository. In one or more embodiments, a data repository is any type of storage unit and/or device (e.g., a file system, database, collection of tables, RAM, and/or any other storage mechanism or medium) for storing data. Further, the data repository may include multiple different storage units and/or devices. The multiple different storage units and/or devices may or may not be of the same type or located at the same physical location.

In one or more embodiments, a health data database (142) is a database that records entries as a series of sets of data items associated with a health data item of a given vProxy and/or virtualization host at a given time. For example, for each vProxy and virtualization host in the virtualization environment, the health data database (142) may include a set of types of health data items obtained related to a vProxy or virtualization host. Such per device health data item information may be organized in any manner, such as in separate tables, aggregated into a single table, etc., and may be organized as a time-series database that records health data items over time.

In one or more embodiments, the health analyzer (128) includes a health analytics engine (146). In one or more embodiments, a health analytics engine (146) is any hardware (e.g., circuitry), software, firmware, or any combination thereof that includes functionality to analyze health data items (discussed above in the description of FIG. 1) associated with vProxies and/or virtualization hosts in a virtualization environment. For example, a health analytics engine (146) may be one or more processes executing on one or more processors of the health analyzer (128). In one or more embodiments, the health analytics engine (146) includes functionality to assess health conditions for vProxies and/or virtualization hosts based on the aforementioned health data items to make a prediction of future health conditions, assign a confidence to the predictions, and rank the predictions based on a confidence analysis.

In one or more embodiments, the health analytics engine (146) includes a cluster generator (148). In one or more embodiments, the cluster generator (148) is operatively connected to the health data database (142). In one or more embodiments, the cluster generator is any hardware (e.g., circuitry), software, firmware, or any combination thereof that includes functionality to use the health data items to group vProxies and/or virtualization hosts into two clusters of vProxies and/or virtualization hosts.

In one or more embodiments, the cluster manager (148) includes functionality to generate clusters using the health data items for the vProxies and/or virtualization hosts. In one or more embodiments, the cluster manager (148) is configured to organize the data to create two clusters (e.g., C1 and C2). In one or more embodiments, the cluster manager (148) uses a clustering algorithm such as a Hierarchical Density-Based Spatial Clustering of Applications with Noise (HDBSCAN). In one or more embodiments, HDBSCAN uses the data to assess the density relationships present in the data, using techniques such as, for example, a nearest neighbor analysis, defining a mutual reachability distance, building minimum spanning trees using an appropriate algorithm, building a hierarchy of cluster with minimum cluster sizes, and then assigning a cluster label to the computing devices for which predicted thermal data items were used as the data set by the cluster generator (148). One of ordinary skill in the art will appreciate that any other clustering analysis algorithm may be used without departing from the scope of embodiments described herein.

In one or more embodiments, the health analytics engine (146) also includes a health status predictor (150). In one or more embodiments, a health status predictor (150) is any hardware (e.g., circuitry), software, firmware, or any combination thereof that includes functionality to use the aforementioned cluster labels created from the data items obtained by the health data collector (140) and stored in the health database (142) to predict health statuses (e.g., health is HIGH or LOW relative to a threshold) for vProxies and/or virtualization hosts in the thermal environment. In one or more embodiments, the health status predictor (150) may use any scheme for determining if a given cluster generated by a cluster generator should be labeled as high health or low health. For example, a health status predictor (150) may use any machine learning algorithm to make the prediction. Such a prediction may be made, for example, by comparing the predicted health associated with a given vProxy and/or virtualization host, along with the cluster label assigned to predict the future health status for the vProxy or virtualization host. In one or more embodiments, one or more thresholds are defined that are used to determine whether a status label assigned to a vProxy and/or virtualization host should be HIGH (i.e., high health) or LOW (i.e., low health).

In one or more embodiments, the health analytics engine (146) also includes a confidence analyzer (152). In one or more embodiments, a confidence analyzer (152) is any hardware (e.g., circuitry), software, firmware, or any combination thereof that includes functionality to use the aforementioned data items obtained by health data collector (140) and stored in the health data database (142), along with the labels assigned by the health status predictor (150), to assign a confidence value to the prediction of health status. In one or more embodiments, the confidence analyzer (152) uses a transductive confidence machine to assign a confidence to each prediction. Such confidence may be assigned, for example, by calculating a non-conformity score relative to possible status predictions, using the non-conformity scores to determine uncertainty values (e.g., p-values), and using the uncertainty values to determine credibility and, ultimately, confidence values for each prediction In one or more embodiments, the health analyzer (128) also includes a health analysis results transmitter (154). In one or more embodiments, a health analysis results transmitter (154) is any hardware (e.g., circuitry), software, firmware, or any combination thereof that includes functionality to receive the results of the analyses performed by the health analytics engine (146), and to organize such results into a data structure. For example, the data structure may be a table that includes rows that include a vProxy or virtualization host identifier, a predicted health status for the vProxy or virtualization host identifier, a confidence value regarding how likely it is that the prediction is correct, and a mechanism (e.g., a user interface button) that allows an entity administrating a virtualization environment to select a vProxy or virtualization host from the list for use in a backup or restore operation.

In one or more embodiments, the listing of predicted health statuses is ranked, with the highest confidence value being highest at the top of the ranking, and the remaining confidence values being ranked in a descending manner thereafter. In one or more embodiments, there is a separate ranking of vProxies or virtualization hosts predicted to be at a high health and vProxy or virtualization hosts predicted to be at a low health. In one or more embodiments, the high health list may be used to select a vProxy or virtualization host to use for a backup or restore operation, and the low health list may be used to draw attention to vProxies or virtualization hosts that are more confidently predicted to be exhibiting low health.

In one or more embodiments, the health analysis results transmitter (154) also includes functionality to take the data structure created, and provide the results therein to an interested entity (e.g., an administrator, a software application performing further analysis of possible virtualization management actions, etc.). For example, the health analysis results transmitter (154) may be in communication with a computing device (not shown) that is configured to display, via a graphical user interface (GUI), the results to a virtualization environment administrator.

While FIG. 1B shows a configuration of components, other configurations may be used without departing from the scope of embodiments described herein. Accordingly, embodiments disclosed herein should not be limited to the configuration of components shown in FIG. 1B.

Figure 2:
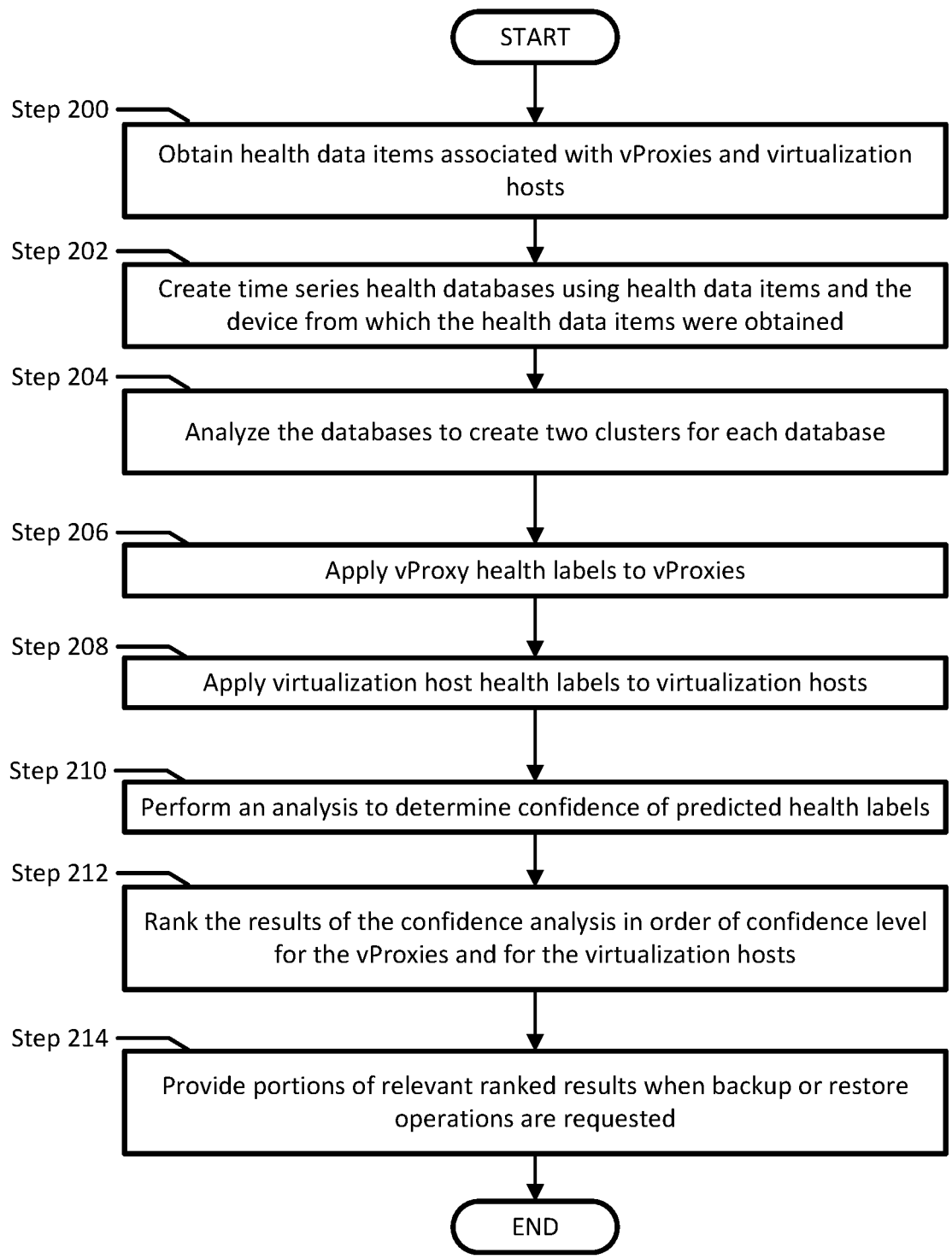
FIG. 2 shows a flowchart in accordance with one or more embodiments of the invention.

FIG. 2 shows a flowchart describing a method for health management of vProxies and virtualization hosts in accordance with one or more embodiments disclosed herein.

While the various steps in the flowchart shown in FIG. 2 are presented and described sequentially, one of ordinary skill in the relevant art, having the benefit of this Detailed Description, will appreciate that some or all of the steps may be executed in different orders, that some or all of the steps may be combined or omitted, and/or that some or all of the steps may be executed in parallel.

Prior to Step 200, although not shown in FIG. 2, one or more virtualization environments are registered with a backup and restore management device, which stores information related to the virtualization environment managers, the virtualization hosts being managed by the virtualization environment manager, and the VMs deployed on the virtualization hosts.

In Step 200, health data items associated with vProxies and virtualization hosts in a virtualization environment are obtained. In one or more embodiments, any number of sets of such data items may be obtained, each associated with a respective vProxy or virtualization host. As discussed above in the description of FIG. 1A, vProxy health data items may include may include, but are not limited to: Such vProxy health data items may include, but are not limited to, supported transport modes (e.g., hotadd, NBD), number of concurrent backup and/or restores being performed, underlying health of the virtualization host (discussed below) on which the vProxy (108, 116) executes, etc. Also as discussed above in the description of FIG. 1A, virtualization host health data items may include, but are not limited to: hypervisor health (e.g., based on errors in hypervisor error logs, hypervisor version, etc.); performance logs for the virtualization host or any portion thereof; storage capacity; system model; operating system version information; a set of data collections and/or types to be backed up; whether or not data is encrypted; whether or not data is to be encrypted when stored by a storage device; backup media type (disk, tape, etc.); whether or not garbage collection services are running; number of concurrent backups and restores being performed; storage characteristics (e.g., information about type of media used for backup, age of media, various attributes of the media, etc.); system model information (e.g., cluster information, generation of system, machine check exception history); information regarding updates and fixes made to a hypervisor after deployment; thermal data (e.g., processor temperature; memory temperature; storage disk temperature, network component temperature; other component temperature; voltage data; current data; power consumption data; ambient temperature data; chassis temperature; inlet temperatures; exhaust temperatures; minimum and maximum temperatures for any component; optical component temperatures; storage controller temperatures; network controller temperatures; alternating current (AC) input information; direct current (DC) input information; fan speed information; fan power consumption information; temperature and power information for various sub-systems; airflow information; etc.). Other types of health data items for vProxies and/or virtualization hosts may be used without departing from the scope of embodiments described herein.

In one or more embodiments, in regards to virtualization host health data items, in some cases the overall health of the virtualization host is of interest. However, any subset of such health data items may be used instead. For example, scenarios may exist where the storage of a virtualization host is to be analyzed to determine health status. Accordingly, in the context of FIG. 2, virtualization host health data items may refer to any or all health data items of a virtualization host, or may apply to the portion of the virtualization host (e.g., storage) for which the analysis is to be performed.

In one or more embodiments, such data items are obtained by a health data collector of a health analyzer. For example, health data items may arrive at a network interface of a health analyzer, and a health data collector may obtain the data items via, at least in part, the network interface.

In Step 202, information (including data items) are stored in a time series health data database. In one or more embodiments, series of health data items are timestamped when stored in the health data database. As an example, health data items may be stored in the health data database by the health data collector performing write operations to write the health data items to a storage medium.

In Step 204, the health data items are used to generate two clusters that are assigned as cluster labels to the computing devices of the thermal environment. In one or more embodiments, HDBSCAN is used to generate and apply the cluster labels to the computing devices. In one or more embodiments, HDBSCAN uses the health data items to assess the density relationships present in the data, using techniques such as, for example, a nearest neighbor analysis, defining a mutual reachability distance, building minimum spanning trees using an appropriate algorithm, building a hierarchy of cluster with minimum cluster sizes, and then assigning a cluster label to the computing devices for which predicted health data items were used as the data set. One of ordinary skill in the art will appreciate that any other clustering analysis algorithm may be used without departing from the scope of embodiments described herein. In one or more embodiments, the clusters are labeled high health and low health, thereby creating a binary classification. In one or more embodiments, though not shown in FIG. 2, an exchangeability test is performed on the labels. In one or more embodiments, if the exchangeability test fails, the entity administrating the virtualization environment is informed, and the vProxy and/or virtualization host selection processes reverts to whatever scheme (e.g., random selection, round-robin selection, etc.) was implemented prior to embodiments described herein. In one or more embodiments, if the exchangeability test passes, then the method proceeds to Step 206

In Step 206, the labels applied to the vProxy clusters are assigned to each specific vProxy. For example, an identifier of a vProxy may be associated with the label that was applied to the cluster within which the vProxy exists.

In Step 208, the labels applied to the virtualization host clusters and the virtualization host clusters are assigned to each specific virtualization host. For example, an identifier of a virtualization host (or of any portion thereof) may be associated with the label that was applied to the cluster within which the virtualization host (or portion thereof) exists.

In Step 210, for the health statuses predicted for the vProxies and virtualization hosts, an analysis is performed to determine a confidence associated with the health status prediction. In one or more embodiments, any prediction confidence scheme may be used to determine the confidence level of a given prediction. One non-limiting example of such a scheme is a transductive confidence machine. In one or more embodiments, such a scheme assesses a future health status prediction against the information in the health data database to determine that, for vProxies or virtualization hosts having similar sets of data items, whether the predicted health status was correct for similar sets of health data items. In one or more embodiments, if a confidence value assigned to a given prediction of health status is below a confidence threshold, then the prediction may be discarded prior to continuing to Step 212.

In Step 212, the predicted health statuses are ranked based on the confidence levels assigned in Step 210 for the vProxies, and separately for the virtualization hosts (or portions thereof). For example, an assessment of ten vProxies that were predicted to have a high health yields a confidence level of each prediction. In one or more embodiments, the predicted health status having the highest confidence value is at the top of the ranking, with each subsequent entry in the ranking having a progressively lower confidence value.

In Step 214, the results of the aforementioned analyses are provided to an entity tasked with managing a virtualization environment when such an entity requests a backup or restore operation. In one or more embodiments, if the request is for a backup operation, the ranked vProxy list may be provided along with the ability for the entity to choose a vProxy for performing the backup operation. In one or more embodiments, if the request is for a restore operation, the entity may be provided with the ranked list of vProxies, and the ranked list of virtualization hosts, and the ability to select from each list for performing the restore operation, thereby selecting the vProxy to perform the operation, and the virtualization host to which a given VM is to be restored. In one or more embodiments, the results include a vProxy identifier of the vProxy for each predicted health status, the predicted thermal status, and the confidence value assigned to the prediction. In one or more embodiments, for a restore operation, the results also include a virtualization host identifier of the virtualization host for each predicted health status, the health status prediction, and the confidence value assigned to the prediction.

In one or more embodiments, the results may be provided to an entity in any way that a collection of data can be presented. For example, an administrator may be provided a table of entries. Such a table may include a listing of each vProxy or virtualization host predicted to have a high health, ranked according to the confidence level of the prediction. In one or more embodiments, such a table may be presented to the administrator as part of a GUI used by the administrator when requesting backup and/or restore operations.

In one or more embodiments, providing the results to an administrator allows the administrator an opportunity to select the most appropriate vProxy and/or virtualization host for the backup or restore operation being requested. In one or more embodiments, the administrator may also receive results that include a ranked list of vProxies or virtualization hosts confidently predicted to have low health, which may allow the administrator to investigate why the low health statuses are being predicted.

FIG. 3 shows an example in accordance with one or more embodiments described herein. The following example is for explanatory purposes only and not intended to limit the scope of embodiments described herein. Additionally, while the example shows certain aspects of embodiments described herein, all possible aspects of such embodiments may not be illustrated in this particular example.

Referring to FIG. 3, consider a scenario in which a backup and restore management device is operatively connected to a virtualization environment. In particular, the backup and restore management device is operatively connected to a virtualization environment manager, which is registered with the backup and restore management device. Via the virtualization environment manager, the backup populates appropriate databases with information related to virtualization hosts in the virtualization environment, and the VMs executing thereon. In this scenario, there are ten virtualization hosts.

Next, the backup and restore management device, via the virtualization environment manager, causes deployment of one vProxy applicant VM on each virtualization host in the virtualization environment. Over time, the vProxies perform various backup and restore operations for VMs. Virtualization host A has vProxy A deployed. Virtualization host B has vProxy B deployed. Virtualization host C has vProxy C deployed. Virtualization host D has vProxy D deployed. Virtualization host E has vProxy E deployed. Virtualization host F has vProxy F deployed. Virtualization host G has vProxy G deployed. Virtualization host H has vProxy H deployed. Virtualization host J has vProxy J deployed. Virtualization host K has vProxy K deployed.

Next, the backup and restore management device obtains vProxy health data items and virtualization host health data items at regular intervals after the ten vProxies have been deployed on the virtualization hosts. For the vProxies, health data items include supported transport modes (e.g., hotadd, NBD), number of concurrent backup and/or restores being performed, and underlying health of the virtualization host on which the vProxy executes. Each time, the backup and restore management device re-assesses the relative health of the vProxies and virtualization hosts by performing an HDBS CAN cluster analysis to create two clusters of vProxies, and two clusters of virtualization hosts using their respective health data items that are stored in a time-series health data database, assigning a high health label and low health label for each pair of clusters, and determining that an exchangeability analysis on the results passes. The backup and restore management device is configured, among other actions, to have a vProxy health label confidence threshold of 60%. Therefore, after the vProxies are ranked according to their label and respective health label confidences, only vProxies with high health label and a confidence value of 60% or above will be presented to the administrator after a backup or restore operation is requested.

Next, a virtualization environment administrator accesses a user interface of the backup and restore management device, and requests that VM_27 on virtualization host D be backed up to storage in an operatively connected data domain. The backup and restore management device has used its health analyzer to create a ranking of the high health vProxies that have confidence values of 60% or higher. The ranked list is shown in an exemplary user interface portion as vProxy Selection Interface (300) in FIG. 3. The health status corresponds to the aforementioned confidence score.

In this scenario, the various analyses determined that, at the time of the request, the vProxies C, F, and G were predicted to have low health. vProxies A, B, D, E, H J, and K were predicted to have high health. However, vProxies D and E had a confidence score of the high health label of less than 60%. Only vProxies A, B, H, J, and K had a high health label confidence prediction above 60%.

Therefore, vProxy Selection Interface (300) presented to the virtualization environment administrator after the backup request for VM_27 on virtualization host D include rows for vProxies A, B, H, J, and K, along with their health status (i.e., confidence scores). In this scenario, VM_27 is deemed by the virtualization environment administrator to be of critical importance to the business of the company that has deployed the virtualization environment. Accordingly, the virtualization environment administrator selects vProxy A, with the highest health score of 95%, to perform the backup operation for VM_27 of virtualization host D.

Next, the backup and restore management device causes vProxy A to perform the backup based, at least in part, on the selection of the virtualization environment administrator.

Figure 4:
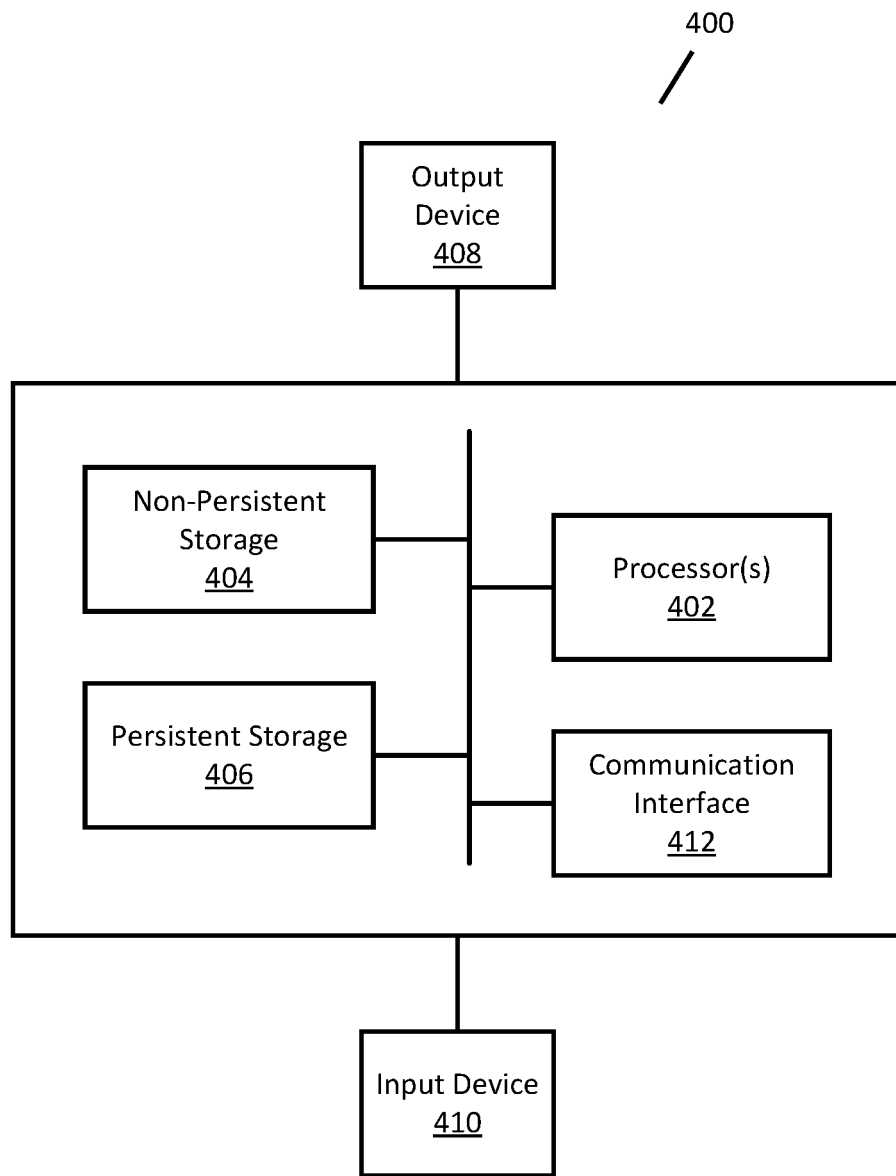
FIG. 4 shows a computing system in accordance with one or more embodiments of the invention.

As discussed above, embodiments of the invention may be implemented using computing devices. FIG. 4 shows a diagram of a computing device in accordance with one or more embodiments of the invention. The computing device (400) may include one or more computer processors (402), non-persistent storage (404) (e.g., volatile memory, such as random access memory (RAM), cache memory), persistent storage (406) (e.g., a hard disk, an optical drive such as a compact disc (CD) drive or digital versatile disc (DVD) drive, a flash memory, etc.), a communication interface (412) (e.g., Bluetooth® interface, infrared interface, network interface, optical interface, etc.), input devices (410), output devices (408), and numerous other elements (not shown) and functionalities. Each of these components is described below.

In one embodiment of the invention, the computer processor(s) (402) may be an integrated circuit for processing instructions. For example, the computer processor(s) may be one or more cores or micro-cores of a processor. The computing device (400) may also include one or more input devices (410), such as a touchscreen, keyboard, mouse, microphone, touchpad, electronic pen, or any other type of input device. Further, the communication interface (412) may include an integrated circuit for connecting the computing device (400) to a network (not shown) (e.g., a local area network (LAN), a wide area network (WAN) such as the Internet, mobile network, or any other type of network) and/or to another device, such as another computing device.

In one embodiment of the invention, the computing device (400) may include one or more output devices (408), such as a screen (e.g., a liquid crystal display (LCD), a plasma display, touchscreen, cathode ray tube (CRT) monitor, projector, or other display device), a printer, external storage, or any other output device. One or more of the output devices may be the same or different from the input device(s). The input and output device(s) may be locally or remotely connected to the computer processor(s) (402), non-persistent storage (404), and persistent storage (406). Many different types of computing devices exist, and the aforementioned input and output device(s) may take other forms.

The problems discussed above should be understood as being examples of problems solved by embodiments of the invention and the invention should not be limited to solving the same/similar problems. The disclosed invention is broadly applicable to address a range of problems beyond those discussed herein.

While embodiments described herein have been described with respect to a limited number of embodiments, those skilled in the art, having the benefit of this Detailed Description, will appreciate that other embodiments can be devised which do not depart from the scope of embodiments as disclosed herein. Accordingly, the scope of embodiments described herein should be limited only by the attached claims.

What is claimed is:

1. A method for managing backup and restore operations, the method comprising:
obtaining a first plurality of health data items associated with a plurality of vProxies;
performing a first clustering analysis using the first plurality of health data items to apply a first vProxy health label to a first portion of the plurality of vProxies and a second vProxy health label to a second portion of the plurality of vProxies;
performing a first confidence analysis to determine a separate vProxy health confidence value for the first vProxy health label assigned to each of the first portion of the plurality of vProxies;
ranking the first portion of the plurality of vProxies based on the first confidence analysis to obtain a ranked vProxy health list;
receiving a request to perform a backup and restore management operation; and
providing, in response to the request, a portion of the ranked vProxy health list to an entity requesting the backup and restore management operation.

2. The method of claim 1, wherein the backup and restore management operation is a backup operation, and the method further comprises:
receiving a selection from the entity of a vProxy from the portion of the ranked vProxy health list; and
performing, based on the selection, the backup operation using the vProxy.

3. The method of claim 1, wherein the backup and restore management operation is a restore operation, and the method further comprises:
receiving a first selection from the entity of a vProxy from the portion of the ranked vProxy health list; and
performing, based on the first selection, the restore operation using the vProxy.

4. The method of claim 3, further comprising, before performing the restore operation:
obtaining a second plurality of data items associated with a plurality of virtualization hosts;
performing a second clustering analysis using the second plurality of data items to apply a first virtualization host health label to a first portion of the plurality of virtualization hosts and a second virtualization host label to a second portion of the plurality of virtualization hosts;
performing a second confidence analysis to determine a separate virtualization host health confidence value for the first virtualization host health label assigned to each of the first portion of the plurality of virtualization hosts;
ranking the first portion of the plurality of virtualization hosts based on the second confidence analysis to obtain a ranked virtualization host health list; and
providing a portion of the ranked virtualization host health list to the entity requesting the restore operation.

5. The method of claim 4, further comprising, before performing the restore operation and after providing the portion of the ranked virtualization host health list to the entity requesting the restore operation:
receiving a second selection from the entity of a virtualization host from the portion of the ranked virtualization host health list,
wherein the restore operation comprises restoring a virtual machine to the virtualization host.

6. The method of claim 4, wherein the first vProxy health label indicates high vProxy health and the first hypervisor health label indicates high hypervisor health.

7. The method of claim 4, wherein the plurality of vProxies and the plurality of virtualization hosts are associated with a virtualization environment manager registered with a backup and restore management device that receives the request to perform the backup and restore management operation.

8. A non-transitory computer readable medium comprising computer readable program code, which when executed by a computer processor enables the computer processor to perform a method for managing backup and restore operations, the method comprising:
   obtaining a first plurality of health data items associated with a plurality of vProxies;
   performing a first clustering analysis using the first plurality of health data items to apply a first vProxy health label to a first portion of the plurality of vProxies and a second vProxy health label to a second portion of the plurality of vProxies;
   performing a first confidence analysis to determine a separate vProxy health confidence value for the first vProxy health label assigned to each of the first portion of the plurality of vProxies;
   ranking the first portion of the plurality of vProxies based on the first confidence analysis to obtain a ranked vProxy health list;
   receiving a request to perform a backup and restore management operation; and
   providing, in response to the request, a portion of the ranked vProxy health list to an entity requesting the backup and restore management operation.

9. The non-transitory computer readable medium of claim 8, wherein the backup and restore management operation is a backup operation, and the method further comprises:
   receiving a selection from the entity of a vProxy from the portion of the ranked vProxy health list; and
   performing, based on the selection, the backup operation using the vProxy.

10. The non-transitory computer readable medium of claim 8, wherein the backup and restore management operation is a restore operation, and the method further comprises:
   receiving a first selection from the entity of a vProxy from the portion of the ranked vProxy health list; and
   performing, based on the first selection, the restore operation using the vProxy.

11. The non-transitory computer readable medium of claim 10, wherein the method further comprises, before performing the restore operation:
   obtaining a second plurality of data items associated with a plurality of virtualization hosts;
   performing a second clustering analysis using the second plurality of data items to apply a first virtualization host health label to a first portion of the plurality of virtualization hosts and a second virtualization host label to a second portion of the plurality of virtualization hosts;
   performing a second confidence analysis to determine a separate virtualization host health confidence value for the first virtualization host health label assigned to each of the first portion of the plurality of virtualization hosts;
   ranking the first portion of the plurality of virtualization hosts based on the second confidence analysis to obtain a ranked virtualization host health list; and
   providing a portion of the ranked virtualization host health list to the entity requesting the restore operation.

12. The non-transitory computer readable medium of claim 11, further comprising, before performing the restore operation and after providing the portion of the ranked virtualization host health list to the entity requesting the restore operation:
   receiving a second selection from the entity of a virtualization host from the portion of the ranked virtualization host health list,
   wherein the restore operation comprises restoring a virtual machine to the virtualization host.

13. The non-transitory computer readable medium of claim 11, wherein the first vProxy health label indicates high vProxy health and the first hypervisor health label indicates high hypervisor health.

14. The non-transitory computer readable medium of claim 11, wherein the plurality of vProxies and the plurality of virtualization hosts are associated with a virtualization environment manager registered with a backup and restore management device that receives the request to perform the backup and restore management operation.

15. A system for managing backup and restore operations, the system comprising:
   a backup and restore management device comprising a processor, a memory device, a storage device, and a health analyzer;
   the health analyzer, comprising circuitry, and configured to:
      obtain a first plurality of health data items associated with a plurality of vProxies;
      perform a first clustering analysis using the first plurality of health data items to apply a first vProxy health label to a first portion of the plurality of vProxies and a second vProxy health label to a second portion of the plurality of vProxies;
      perform a first confidence analysis to determine a separate vProxy health confidence value for the first vProxy health label assigned to each of the first portion of the plurality of vProxies;
      rank the first portion of the plurality of vProxies based on the first confidence analysis to obtain a ranked vProxy health list;
      receive a request to perform a backup and restore management operation; and
      provide, in response to the request, a portion of the ranked vProxy health list to an entity requesting the backup and restore management operation.

16. The system of claim 15, wherein the backup and restore management operation is a backup operation, and the backup and restore management device is further configured to:
   receive a selection from the entity of a vProxy from the portion of the ranked vProxy health list; and
   perform, based on the selection, the backup operation using the vProxy.

17. The system of claim 15, wherein the backup and restore management operation is a restore operation, and the backup and restore management device is further configured to:
   receive a first selection from the entity of a vProxy from the portion of the ranked vProxy health list; and
   perform, based on the first selection, the restore operation using the vProxy.

18. The system of claim 17, wherein, before performing the restore operation, the backup and restore management device is further configured to:
   obtain a second plurality of data items associated with a plurality of virtualization hosts;

perform a second clustering analysis using the second plurality of data items to apply a first virtualization host health label to a first portion of the plurality of virtualization hosts and a second virtualization host label to a second portion of the plurality of virtualization hosts;

perform a second confidence analysis to determine a separate virtualization host health confidence value for the first virtualization host health label assigned to each of the first portion of the plurality of virtualization hosts;

rank the first portion of the plurality of virtualization hosts based on the second confidence analysis to obtain a ranked virtualization host health list; and provide a portion of the ranked virtualization host health list to the entity requesting the restore operation.

19. The system of claim 18, wherein, before performing the restore operation and after providing the portion of the ranked virtualization host health list to the entity requesting the restore operation, the backup and restore management device is further configured to:

receive a second selection from the entity of a virtualization host from the portion of the ranked virtualization host health list, wherein:
the restore operation comprises restoring a virtual machine to the virtualization host; and
the first vProxy health label indicates high vProxy health and the first hypervisor health label indicates high hypervisor health.

20. The system of claim 18, wherein the plurality of vProxies and the plurality of virtualization hosts are associated with a virtualization environment manager registered with a backup and restore management device that receives the request to perform the backup and restore management operation.

* * * * *